United States Patent
Kodama et al.

(10) Patent No.: US 6,857,976 B2
(45) Date of Patent: Feb. 22, 2005

(54) ROTATION FORCE TRANSMITTER AND TRANSMISSION MECHANISM

(75) Inventors: Takamitsu Kodama, Yaita (JP); Hiroshi Watanabe, Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 60 days.

(21) Appl. No.: 10/102,845

(22) Filed: Mar. 22, 2002

(65) Prior Publication Data

US 2002/0169045 A1 Nov. 14, 2002

(30) Foreign Application Priority Data

Mar. 23, 2001 (JP) .................................... P2001-084239

(51) Int. Cl.⁷ .......................... F16D 3/12; F16H 16/18; F16H 57/12
(52) U.S. Cl. .......................... 474/94; 474/161; 74/411; 464/74
(58) Field of Search .......................... 474/161, 94, 902; 74/411, 572, 574, 443, 440, 409; 464/66, 74, 73, 61–63, 83, 81

(56) References Cited

U.S. PATENT DOCUMENTS

| | | | | |
|---|---|---|---|---|
| 480,439 A | * | 8/1892 | Seaton | 464/66 |
| 2,659,219 A | * | 11/1953 | Mosso et al. | 464/74 |
| 2,961,856 A | * | 11/1960 | Selzer | 464/74 |
| 4,328,879 A | * | 5/1982 | Tone | 474/94 |
| 4,486,183 A | * | 12/1984 | Posiviata et al. | 474/94 |
| 5,692,410 A | * | 12/1997 | Fenelon | 74/411 |
| 5,791,190 A | * | 8/1998 | Konno | 74/411 |
| 6,045,448 A | * | 4/2000 | Kern et al. | 464/74 |
| 6,161,512 A | * | 12/2000 | Beels Van Heemstede | 74/574 |

FOREIGN PATENT DOCUMENTS

| | | |
|---|---|---|
| JP | 6-249321 A | 9/1994 |
| JP | 2001-665 A | 1/2001 |

* cited by examiner

*Primary Examiner*—Marcus Charles
(74) *Attorney, Agent, or Firm*—Birch, Stewart, Kolasch & Birch, LLP

(57) ABSTRACT

A rotation force transmitter and a rotation force transmission mechanism are provided, which are light-weight and suppresses vibrations in the perimeter and radial directions. A junction flywheel, which is a rotation force transmitter, includes a pulley portion, a hub portion and elastic structures. An inside perimeter of the pulley portion and an outside perimeter of the hub portion are connected by the plurality of elastic structures absorbing vibrations in the perimeter direction and in the radial direction. The elastic structure has an annular member, and the annular member absorbs vibrations and torque fluctuations in the perimeter direction and in the radial direction transmitted from a rotation driving source such as a motor. Therefore, vibrations and torque fluctuations are prevented from being transmitted to a driven flywheel which is a rotated member provided with a rotation force by the motor.

10 Claims, 4 Drawing Sheets

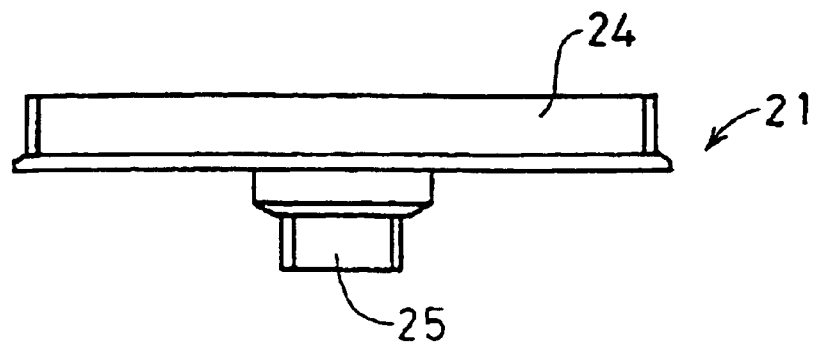
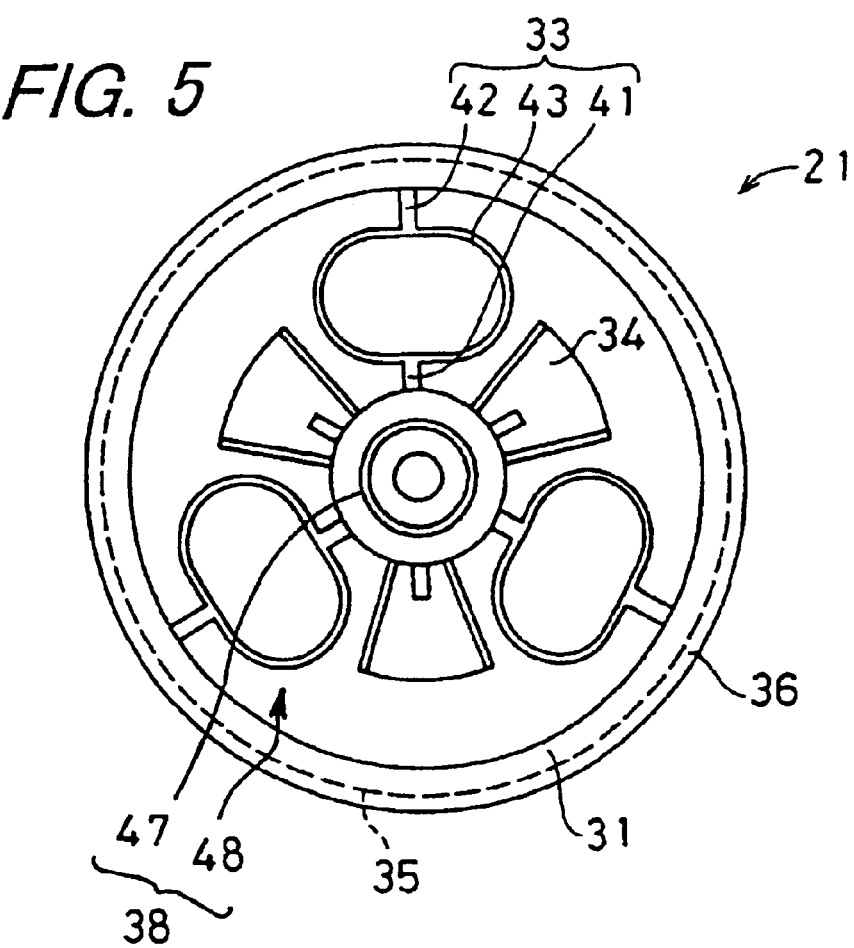

ROTATION FORCE TRANSMITTER AND TRANSMISSION MECHANISM

This nonprovisional application claims priority under 35 U.S.C. § 119(a) on patent application No. 2001-84239 filed in JAPAN on Mar. 23, 2001, which is herein incorporated by reference.

BACKGROUND OF THE INVENTION

1. Field of the Invention

The present invention relates to a rotation force transmission mechanism and a rotation force transmitter which is built in the same.

2. Description of the Related Art

With regard to a rotation mechanism in which a rotation force of a rotation driving source such as a stepping motor is transmitted to a rotated member via a rotation force transmitter, there is a problem that vibrations and torque fluctuations (rotation unevenness) generated by the rotation driving source is transmitted to the rotated member. In the related art, for the purpose of solving this problem, a load which has a flywheel effect is mounted on a rotation driving force or such a load is built in a rotation force transmission member, whereby vibrations and torque fluctuations transmitted to a rotated member are suppressed. However, in the case of the related art methods, the weight of a rotation force transmission mechanism becomes heavy.

FIG. 6 is a view showing a related art rotation force transmission mechanism, and FIG. 7 is a side view taken along an arrow A of FIG. 6. In a rotation force transmission mechanism 1, vibrations and torque fluctuations generated by a rotation driving source 3 are transmitted via a first driving transmission belt 4 to a junction flywheel 2 which is a rotation force transmitter, and transmitted via a pulley portion 5 and a hub portion 6 of the junction flywheel 2 and a second driving transmission belt 7 to a pulley portion 9 of a driven flywheel 8 which is a rotated member. The junction flywheel 2 having a heavy weight suppresses vibrations and torque fluctuations. However, according to the related art, the junction flywheel has a heavy weight and therefore cannot abruptly start rotating or abruptly stop rotating.

Further, other related art mechanisms are disclosed in Japanese Unexamined Patent Publications JP-A 6-249321 (1994) and JP-A 2001-665 (2001). In JP-A 6-249321, between an inside perimeter of an annular pulley portion and an outside perimeter of a hub portion, a vibration-absorbing elastic body made of an elastic material is connected. The vibration-absorbing elastic body prevents that vibrations and torque fluctuations are transmitted from the pulley portion to the hub portion (or from the hub portion to the pulley portion). However, according to the related art, selection of a material of the vibration-absorbing elastic body is difficult, the number of components increases, and because the vibration-absorbing elastic body, the hub portion and the pulley portion are made of different materials, respectively, it is difficult to join the vibration-absorbing elastic body and the hub portion and join the vibration-absorbing elastic body and the pulley portion, with the result that a cost becomes high.

Further, in JP-A 2001-665, an inside perimeter of an annular pulley portion and an outside perimeter of a hub portion are connected by a plurality of spokes which are placed at predetermined spaces in the perimeter direction, whereby vibrations and torque fluctuations are suppressed. Although, in this related art, the spokes become elastically deformed along the perimeter direction of the pulley portion and thereby vibrations in the perimeter direction are suppressed, vibrations in the radial direction cannot be suppressed.

SUMMARY OF THE INVENTION

Hence, an object of the present invention is to provide a rotation force transmitter and a rotation force transmission mechanism which suppress vibrations in the perimeter direction and in the radial direction and which are light-weight.

The invention is a rotation force transmitter, comprising:
an annular pulley portion having projections and depressions on an outside perimeter thereof;
a hub portion having projections and depressions on an outside perimeter thereof; and
elastic structures which are placed at predetermined spaces in the perimeter direction and connect an inside perimeter of the pulley portion and the outside perimeter of the hub portion, for absorbing vibrations in the perimeter and radial directions.

According to the invention, the rotation force transmitter comprises a pulley portion, a hub portion and elastic structures. The pulley portion and the hub portion have circular shapes and have projections and depressions which function as belt guiding grooves or teeth on outside perimeters thereof, and a belt fits into the projections and depressions. An inside perimeter of the pulley portion and the outside perimeter of the hub portion are connected by a plurality of elastic structures which absorb vibrations in the perimeter direction and in the radial direction. Since the elastic structures absorb vibrations and torque fluctuations transmitted from a rotation driving source such as a motor, it is prevented that the vibrations and torque fluctuations are transmitted via the rotation force transmitter of the invention to a rotated member which receives a rotation force from the rotation driving source.

Further, the invention is characterized in that the elastic structure includes:
a first connecting piece which protrudes outwardly in the radial direction from the outside perimeter of the hub portion;
a second connecting piece which protrudes inwardly in the radial direction from the inside perimeter of the pulley portion; and
an annular member which connects the first connecting piece and the second connecting piece.

According to the invention, the annular member of the elastic structure can absorb and attenuate vibrations in the perimeter direction and vibrations in the radial direction. As a result, it is possible to reduce vibrations and torque fluctuations transmitted from the hub portion to the pulley portion (or from the pulley portion to the hub portion).

Still further, the invention further comprises weights which are placed between the elastic structures, respectively, and protrude in the radial direction from the outside perimeter of the hub portion.

According to the invention, a plurality of weights are disposed which continue from the outside perimeter of the hub portion between the elastic structures and protrude outwardly in the radial direction, respectively, and the weights function as so-called flywheels. The weights can prevent transmission of vibrations and torque fluctuations also. Moreover, the weights also have a function of deterring deformation destruction of the elastic structures due to an excessive driving force transmitted from the rotation driving source to the rotation force transmitter.

Still further, the invention is characterized in that the annular member has an oval shape.

According to the invention, owing to the annular member being oval, it is possible to absorb and attenuate vibrations in the perimeter direction and vibrations in the radial direction.

Still further, the invention is characterized in that the annular member has a circular shape.

According to the invention, owing to the annular member being circular, it is possible to absorb and attenuate vibrations in the perimeter direction and vibrations in the radial direction.

Still further, the invention is characterized in that the pulley portion, the hub portion, the elastic structures and the weights are made of a single material and formed into one piece.

According to the invention, the rotation force transmitter having the pulley portion, the hub portion, the elastic structures and the weights is made of a single material such as plastic, and molded integrally by a method such as injection molding or extrusion molding. Therefore, it is possible to achieve weight reduction, size reduction and cost reduction of the rotation force transmitter.

Still further, the invention is a rotation force transmission mechanism, comprising:

the above-mentioned rotation force transmitter;
a rotation driving source having an output axis having projections and depressions on an outside perimeter thereof;
a rotated member having projections and depressions on an outside perimeter thereof;
a first belt which is endless and stretched around the outside perimeter of the pulley portion of the rotation force transmitter and around the outside perimeter of the output axis of the rotation driving source; and
a second belt which is endless and stretched around the outside perimeter of the hub portion of the rotation force transmitter and around the outside perimeter of the rotated member.

According to the invention, a rotation force of the rotation driving source such as a stepping motor is transmitted via the endless first belt to the pulley portion of the rotation force transmitter, and transmitted from the hub portion of the rotation force transmitter to the rotated member via the second belt. At this moment, vibrations and torque fluctuations generated by the rotation driving source are absorbed and attenuated by the rotation force transmitter, so that vibrations and torque fluctuations transmitted to the rotated member are reduced markedly.

BRIEF DESCRIPTION OF THE DRAWINGS

Other and further objects, features, and advantages of the invention will be more explicit from the following detailed description taken with reference to the drawings wherein:

FIG. 4 is a side view taken along an arrow B of FIG. 1;

FIG. 5 is a back view of the junction flywheel;

DETAILED DESCRIPTION OF THE PREFERRED EMBODIMENTS

Figure 1:
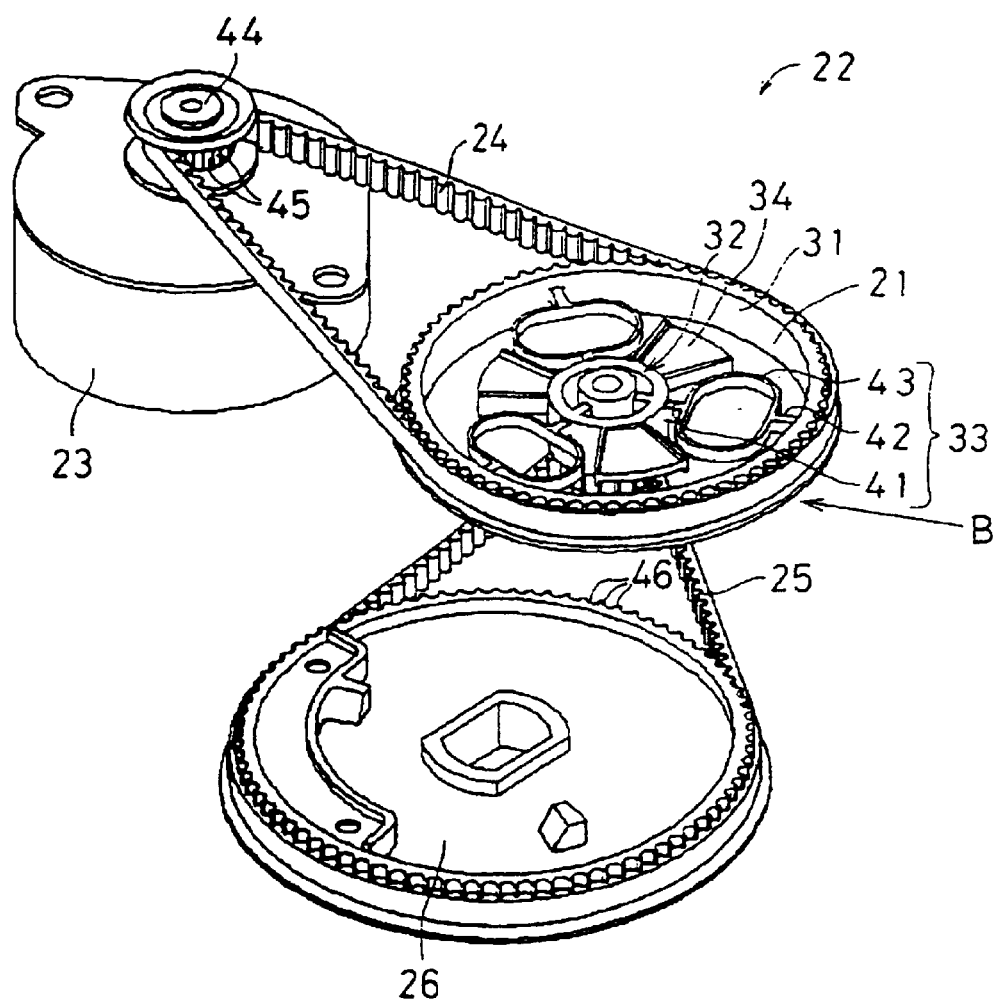
FIG. 1 is a perspective view showing a rotation force transmission mechanism which is equipped with a junction flywheel.

Now referring to the drawings, preferred embodiments of the invention are described below.

FIG. 1 is a perspective view showing a rotation force transmission mechanism which is equipped with a junction flywheel. A rotation force transmission mechanism 22 comprises a junction flywheel 21, a stepping motor 23 which is a rotation driving source, a driven flywheel 26 which is a rotated member, a first driving transmission belt 24 and a second driving transmission belt 25. The first driving transmission belt 24 is formed in an endless shape, and is a toothed belt which has a plurality of teeth on an inside perimeter thereof. The second driving transmission belt 25 is formed in an endless shape, and is a toothed belt which has a plurality of teeth on an inside perimeter thereof.

Figure 2:
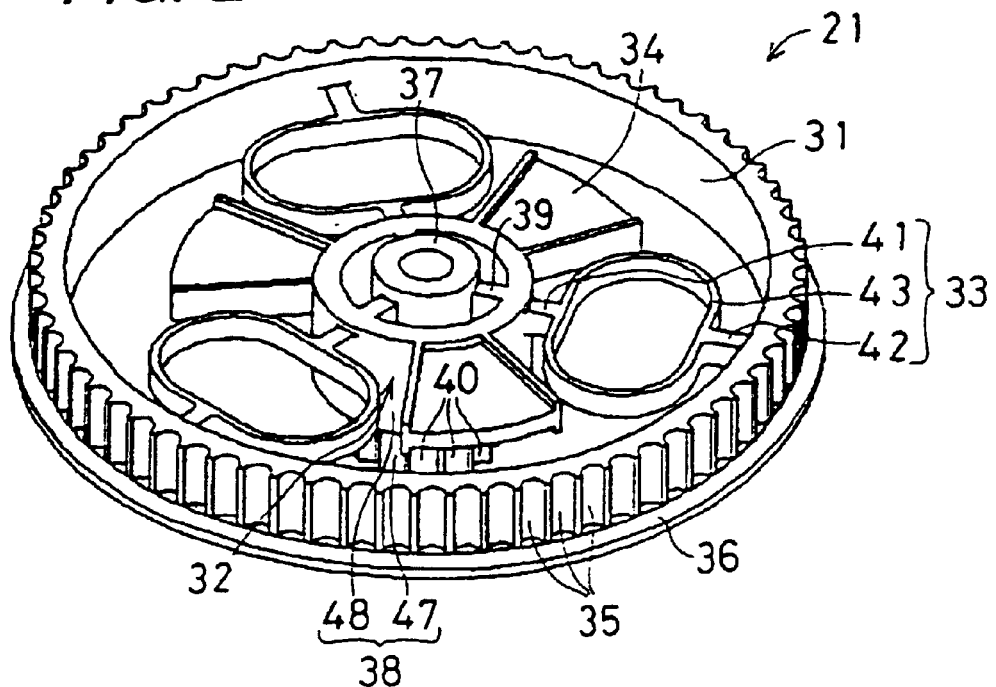
FIG. 2 is a perspective view of the function flywheel.
Figure 3:
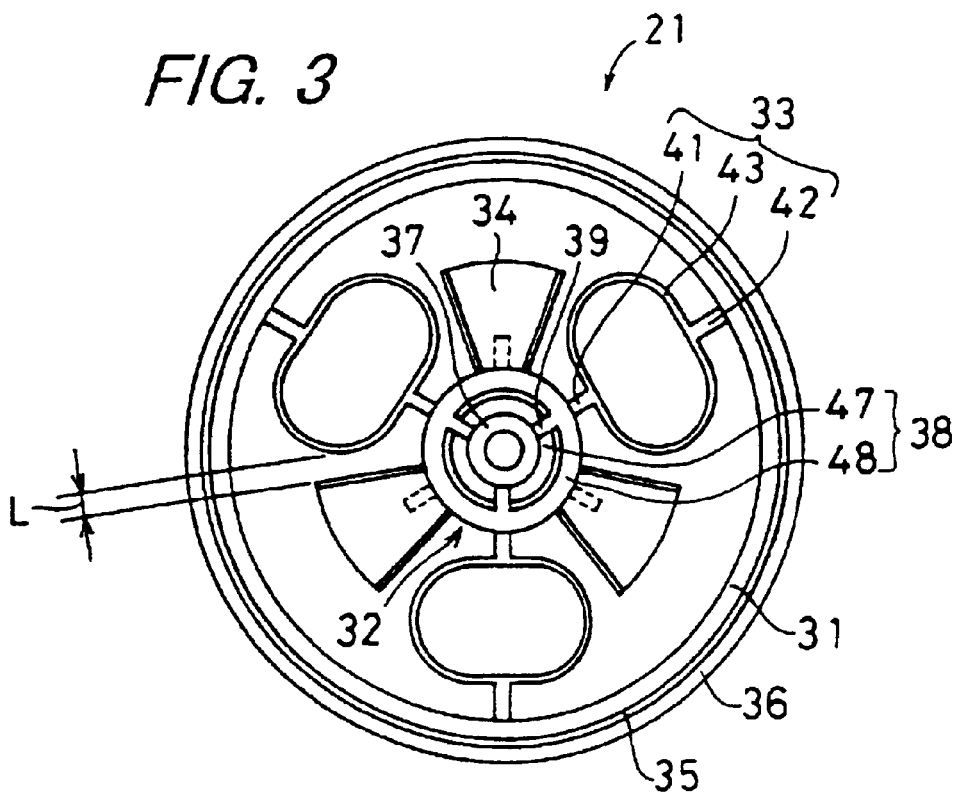
FIG. 3 is a plan view of the junction flywheel.

Firstly, referring to FIGS. 2 to 5, the junction flywheel 21 will be described. FIG. 2 is a perspective view of the junction flywheel 21, FIG. 3 is a plan view of the junction flywheel 21, FIG. 4 is a side view taken along an arrow B of FIG. 1, and FIG. 5 is a back view of the junction flywheel 21. The junction flywheel 21 includes a pulley portion 31, a hub portion 32, a plurality of (in the embodiment, three) elastic structures 33, and a plurality of (in the embodiment, three) weights 34.

The pulley portion 31 is a large-diameter circular member, and all around an outside perimeter thereof are formed a plurality of teeth constituting a plurality of belt guiding grooves 35, with which a plurality of teeth constituting belt grooves of the first driving belt 24 are engaged. On one end side in the width direction of the pulley portion 31 (downward in FIG. 2), a flange portion 36 is formed which continues from the pulley portion 31 and protrudes outwardly in the radial direction thereof.

The hub portion 32 includes a hub portion main body 38, an axle 37, and a plurality of (in the embodiment, three) connecting portions 39 which connect the hub portion main body 38 and the axle 37. The hub portion main body 38 is a circular stepped member. A small-diameter portion 47 of the hub portion main body 38 protrudes more than the flange portion 36 of the pulley portion 31 to one side in the width direction, that is, to one side in the direction of a rotation axis of the junction flywheel 21 (downward in FIG. 2), and all around an outside perimeter of the small-diameter portion 47 are formed a plurality of teeth constituting belt guiding grooves 40, with which a plurality of teeth constituting belt grooves of the second driving belt 25 are engaged. The axle 37 is a circular member which has a smaller diameter than the hub portion main body 38, and placed coaxially inside the hub portion main body 38. An outside perimeter of the axle 37 and an inside perimeter of the hub portion main body 38 are connected by three connecting portions 39 which are placed at predetermined spaces in the perimeter direction.

The hub portion 32 is placed coaxially inside the pulley portion 31, and an inside perimeter of the pulley portion 31 and an outside perimeter of a large-diameter portion 48 of the hub portion main body 38 are connected by a plurality of (in the embodiment, three) elastic structures 33 which are placed at predetermined spaces in the perimeter direction. The elastic structure 33 includes a first connecting piece 41 which continues from the outside perimeter of the hub portion main body 38 and protrudes outwardly in the radial direction thereof, a second connecting piece 42 which continues from the inside perimeter of the pulley portion 31 and protrudes inwardly in the radial direction thereof, and an annular member 43 which connects the first connecting piece 41 and the second connecting piece 42.

In the embodiment shown by FIG. 2, the annular member 43 has a so-called oval shape, which is formed by two linear portions and two curved portions. The linear portions are spaced each other in parallel. One of the curved portions connects one-side ends of the linear portions while curving outwardly. The other curved portion connects the other-side ends of the linear portions while curving outwardly. In the annular member 43, one of the linear lines is connected with the first connecting piece 41 around a central portion in the direction of the length thereof, and the other linear portion is connected with the second connecting piece 42 around a central portion in the direction of the length thereof. That is to say, the annular member 43 is placed in a manner that a long axis thereof intersects, for example, intersects at right angles, a radial axis thereof which ties the first connecting piece 41 and the second connecting piece 42. With this constitution, the linear portions of the annular member 43 deform in a direction of coming close to each other, with the result that it is possible to effectively attenuate vibrations in the perimeter direction and vibrations in the radial direction of the pulley portion 31.

Although the annular member 43 has an oval shape in the embodiment shown by FIG. 2, the annular member 43 may have a circular shape in another embodiment of the invention.

The respective weights 34 are fan-shaped members, placed at predetermined spaces between the respective elastic structures, and formed so as to continue from the outside perimeter of the large-diameter portion 48 of the hub portion main body 38. The respective weights 34 protrude so as to become wider outwardly in the radial direction.

Figure 6:
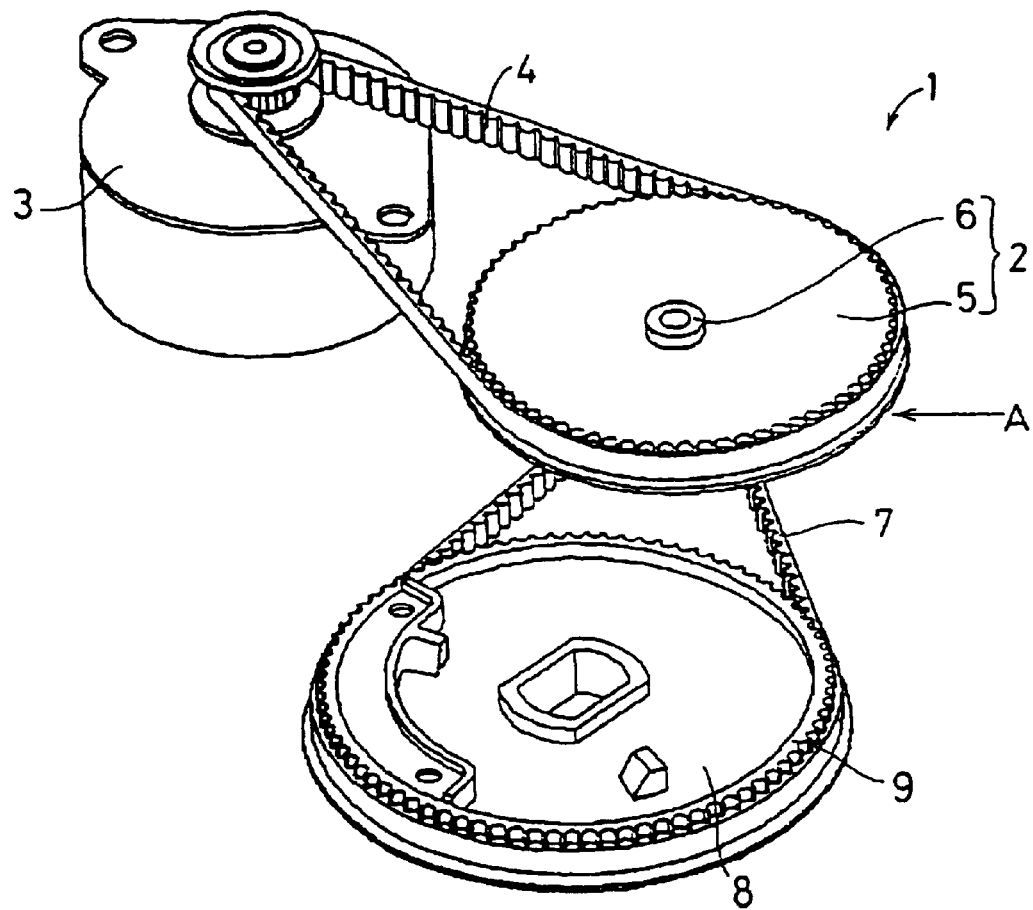
FIG. 6 is a view showing a related art rotation force transmission mechanism.
Figure 7:
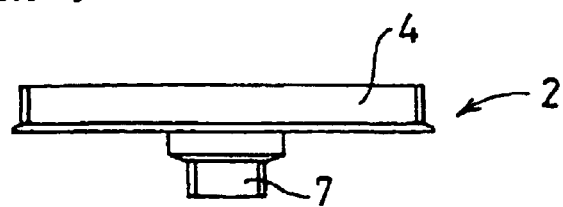
FIG. 7 is a side view taken along an arrow A of FIG. 6.

The above-mentioned junction flywheel 21 comprising the pulley portion 31, the hub portion 32, the elastic structures 33 and the weights 34 has a lot of interstices, and has a lighter weight than a related art junction flywheel 5 shown by FIG. 6. Therefore, the invention can achieve a lighter-weight electronic device equipped with the rotation force transmission mechanism 22 having the junction flywheel 21 than that of the related art mechanism.

Further, the junction flywheel 21 is integrally formed with a material such as plastic by injection molding or extrusion molding. Therefore, it is possible to achieve size reduction and cost reduction as well as weight reduction.

Referring back to FIG. 1, the rotation force transmission mechanism 22 equipped with the junction flywheel 21 constituted in the above manner will be described in detail. On an outside perimeter of an output axis 44 of the stepping motor 23 are formed a plurality of teeth constituting a plurality of belt guiding grooves 45, with which the plurality of teeth constituting the belt grooves of the first driving belt 24 are engaged. Around the outside perimeter of the output axis 44 of the stepping motor 23 and the outside perimeter of the pulley portion 31 of the function flywheel 21, the first driving transmission belt 24 is stretched, which is endless and has a plurality of teeth constituting belt grooves on the inside perimeter thereof. When the first driving transmission belt 24 shifts to one side in the direction of the axis of the junction flywheel 21, the first driving transmission belt 24 comes in contact with the flange portion 36. Therefore, the flange portion 36 prevents that the first driving transmission belt 24 leaves from the junction flywheel 21 to one side in the axial direction.

The driven flywheel 26 is a circular member, and on an outside perimeter thereof are formed a plurality of teeth constituting belt guiding grooves 46, with which the plurality of teeth constituting the belt grooves of the second driving transmission belt 25 are engaged. Around the outside perimeter of the driven flywheel 26 and the outside perimeter of the hub portion 32 of the junction flywheel 21, the second driving transmission belt 25 is stretched, which is endless and has a plurality of teeth constituting the belt grooves on the inside perimeter thereof.

Next, an action of the rotation force transmission mechanism 22 will be explained. When the stepping motor 23 is driven to rotate the output axis 44, the junction flywheel 21 supported by a not-shown supporting axis is rotated via the first driving transmission belt 24, and the driven flywheel 26 is rotated via the second driving transmission belt 25.

At this moment, vibrations and torque fluctuations generated by the stepping motor 23 are transmitted to the pulley portion 31 of the junction flywheel 21 via the first driving transmission belt 24. The vibrations and torque fluctuations transmitted to the pulley portion 31 are transmitted to the annular members 43 via the second connecting pieces 42. The annular members 43 absorb and attenuate the transmitted vibrations and torque fluctuations. Therefore, vibrations and torque fluctuations transmitted from the pulley portion 31 to the hub portion 32 are reduced markedly, so that vibrations and torque fluctuations transmitted via the second driving transmission belt 25 to the driven flywheel 26 can be suppressed.

Further, as described above, the annular members 43 are interposed between the pulley portion 31 and the hub portion 32, so that the annular members 43 absorb and attenuate not only vibrations and torque fluctuations in the radial direction but also vibrations and torque fluctuations in the peripheral direction.

Still further, the junction flywheel 21 has the plurality of weights 34, so that the weights 34 function as flywheels, thereby being able to attenuate vibrations and torque fluctuations also. Moreover, the hub portion main body 38 of the hub portion 32 also has a function as a flywheel. Furthermore, the weights 34 also have a function of deterring deformation destruction of the elastic structures 33 due to an excessive driving force transmitted from the stepping motor 23 to the junction flywheel 21.

Still further, by adjusting a clearance L between the weight 34 and the elastic structure 33 as necessary, it is possible to change a time-lag at the time of starting and stopping rotation force transmission.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A rotation force transmitter, comprising:
    an annular pulley portion having projections and depressions on an outside perimeter thereof;
    a hub portion having projections and depressions on an outside perimeter thereof; and
    elastic structures which are placed at predetermined spaces in the perimeter direction and connect an inside perimeter of the pulley portion and the outside perimeter of the hub portion, for absorbing vibrations in the perimeter and radial directions,
    wherein each elastic structure includes:
    a first connecting piece which protrudes outwardly in the radial direction from the outside perimeter of the hub portion;

a second connecting piece which protrudes inwardly in the radial direction from the inside perimeter of the pulley portion; and an annular member which connects the first connecting piece and the second connecting piece.

2. The rotation force transmitter of claim 1, wherein the annular member has an oval shape.

3. The rotation force transmitter of claim 1, wherein the annular member has a circular shape.

4. A rotation force transmitter, comprising:

an annular pulley portion having projections and depressions on an outside perimeter thereof;

a hub portion having projections and depressions on an outside perimeter thereof;

elastic structures which are placed at predetermined spaces in the perimeter direction and connect an inside perimeter of the pulley portion and the outside perimeter of the hub portion, for absorbing vibrations in the perimeter and radial directions; and weights which are placed between the elastic structures, respectively, and protrude in the radial direction from the outside perimeter of the hub portion.

5. The rotation force transmitter of claim 4, wherein the pulley portion, the hub portion, the elastic structures and the weights are made of a single material and formed into one piece.

6. A rotation force transmission mechanism, comprising:

a rotation force transmitter including an annular pulley portion having projections and depressions on an outside perimeter thereof, a hub portion having projections and depressions on an outside perimeter thereof, and elastic structures which are placed at predetermined spaces in the perimeter direction and connect an inside perimeter of the pulley portion and the outside perimeter of the hub portion, for absorbing vibrations in the perimeter and radial directions;

a rotation driving source having an output axis having projections and depressions on an outside perimeter thereof;

a rotated member having projections and depressions on an outside perimeter thereof;

a first belt which is endless and stretched around the outside perimeter of the pulley portion of the rotation force transmitter and around the outside perimeter of the output axis of the rotation driving source; and a second belt which is endless and stretched around the outside perimeter of the hub portion of the rotation force transmitter and around the outside perimeter of the rotated member wherein each elastic structure includes:

a first connecting piece which protrudes outwardly in the radial direction from the outside perimeter of the hub portion;

a second connecting piece which protrudes inwardly in the radial direction from the inside perimeter of the pulley portion; and an annular member which connects the first connecting piece and the second connecting piece.

7. The rotation force transmission mechanism of claim 6, wherein the annular member has an oval shape.

8. The rotation force transmission mechanism of claim 6, wherein the annular member has a circular shape.

9. A rotation force transmission mechanism, comprising:

a rotation force transmitter including an annular pulley portion having projections and depressions on an outside perimeter thereof, a hub portion having projections and depressions on an outside perimeter thereof, and elastic structures which are placed at predetermined spaces in the perimeter direction and connect an inside perimeter of the pulley portion and the outside perimeter of the hub portion, for absorbing vibrations in the perimeter and radial directions;

a rotation driving source having an output axis having projections and depressions on an outside perimeter thereof;

a rotated member having projections and depressions on an outside perimeter thereof;

a first belt which is endless and stretched around the outside perimeter of the pulley portion of the rotation force transmitter and around the outside perimeter of the output axis of the rotation driving source;

a second belt which is endless and stretched around the outside perimeter of the hub portion of the rotation force transmitter and around the outside perimeter of the rotated member and weights which are placed between the elastic structures, respectively, and protrude in the radial direction from the outside perimeter of the hub portion.

10. The rotation force transmission mechanism of claim 9, wherein the pulley portion, the hub portion, the elastic structures and the weights are made of a single material and formed into one piece.

* * * * *